(12) United States Patent
Barber

(10) Patent No.: US 9,061,429 B2
(45) Date of Patent: Jun. 23, 2015

(54) PUMPKIN CARVING SPOON WITH NESTED KNIFE

(71) Applicant: Bradshaw International, Inc., Rancho Cucamonga, CA (US)

(72) Inventor: Tom Barber, Redondo Beach, CA (US)

(73) Assignee: BRADSHAW INTERNATIONAL, INC., Rancho Cucamonga, CA (US)

( * ) Notice: Subject to any disclaimer, the term of this patent is extended or adjusted under 35 U.S.C. 154(b) by 153 days.

(21) Appl. No.: 13/839,962

(22) Filed: Mar. 15, 2013

(65) Prior Publication Data

US 2014/0259684 A1    Sep. 18, 2014

(51) Int. Cl.
| | |
|---|---|
| A47G 21/06 | (2006.01) |
| B26B 29/02 | (2006.01) |
| A47J 43/28 | (2006.01) |

(52) U.S. Cl.
CPC ............. B26B 29/025 (2013.01); A47G 21/06 (2013.01); A47J 43/288 (2013.01)

(58) Field of Classification Search
CPC ....... A47G 21/02; A47G 21/04; A47G 21/06; A47J 43/288; B26B 29/025
USPC ........ 30/147–150, 322–328; 7/110, 112, 113, 7/158, 167; D7/643, 650, 691, 693
See application file for complete search history.

(56) References Cited

U.S. PATENT DOCUMENTS

| | | | |
|---|---|---|---|
| 32,916 A | 7/1861 | Richards | |
| 34,069 A * | 1/1862 | Neill | 30/147 |
| 34,098 A | 1/1862 | Hardie et al. | |
| RE7,925 E * | 10/1877 | Ulmer | 30/147 |
| 281,646 A * | 7/1883 | Sturdy | 7/167 |
| 456,784 A * | 7/1891 | Varell | 30/149 |
| 468,592 A | 2/1892 | Blackwell | |
| 669,884 A | 3/1901 | Stoddard | |
| 920,235 A | 5/1909 | Aagaard | |
| 1,065,170 A * | 6/1913 | Poettich | 30/147 |
| D48,065 S * | 11/1915 | Kalnianczyn | 30/147 |
| 1,204,676 A * | 11/1916 | Mchuga | 7/158 |
| 1,229,696 A * | 6/1917 | Woods | 30/147 |

(Continued)

FOREIGN PATENT DOCUMENTS

| | | | |
|---|---|---|---|
| DE | 102009030050 A1 * | 3/2011 | |
| DE | 202014001823 U1 * | 4/2014 | |

(Continued)

OTHER PUBLICATIONS

WILLIAMS-SONOMA® Pumkin Carving Kit Instructions, 2002.*

(Continued)

*Primary Examiner* — Jason Daniel Prone
(74) *Attorney, Agent, or Firm* — Birch, Stewart, Kolasch & Birch, LLP

(57) ABSTRACT

A pumpkin carving tool has a knife nested within the handle of a scoop. The knife and scoop together serve as the only tools necessary to carve a simple or complex pattern into a pumpkin. The handle extends under the bowl of the scoop and has a hollow interior. The knife has a handle and blade and the dimensions of the handle closely approximate the interior dimensions of the handle. In this way, the knife is securely retained within the handle until removed by the handle. By providing a knife nested within the scoop, a user has all utensils needed to carve a pumpkin or similar item in a convenient, compact configuration.

16 Claims, 8 Drawing Sheets

(56) References Cited

U.S. PATENT DOCUMENTS

| | | | | |
|---|---|---|---|---|
| 1,288,617 | A * | 12/1918 | Kupiszewski | 30/324 |
| 1,381,339 | A * | 6/1921 | Rosen | 30/150 |
| 1,435,890 | A * | 11/1922 | Bothe | 30/328 |
| 1,451,542 | A * | 4/1923 | Ftyklo | 30/147 |
| 1,452,337 | A * | 4/1923 | Brecel | 30/147 |
| 1,814,547 | A | 7/1931 | Edwards | |
| 2,005,176 | A * | 6/1935 | Arbuckle | 7/167 |
| 2,105,239 | A * | 1/1938 | Bachtold | 7/167 |
| 2,109,016 | A | 2/1938 | Ringer | |
| 2,456,858 | A * | 12/1948 | Bolling | 30/147 |
| 2,470,492 | A * | 5/1949 | Jenkins | 30/147 |
| 2,559,689 | A * | 7/1951 | Truesdell | 7/167 |
| 3,056,200 | A * | 10/1962 | Williams | 30/148 |
| 3,252,489 | A * | 5/1966 | Huston et al. | 7/167 |
| 3,621,899 | A * | 11/1971 | Hula | 30/122 |
| 3,885,271 | A * | 5/1975 | Kollander | 30/136 |
| 3,967,376 | A * | 7/1976 | Foley | 30/150 |
| 3,991,466 | A * | 11/1976 | Smith | 30/149 |
| 4,030,194 | A * | 6/1977 | Hendricks | 30/143 |
| 4,097,945 | A * | 7/1978 | Scott | 7/158 |
| 4,114,216 | A * | 9/1978 | Gatby | 7/167 |
| 4,332,409 | A | 6/1982 | Stachowicz | |
| 4,377,035 | A * | 3/1983 | Dalichow | 30/147 |
| 4,519,108 | A * | 5/1985 | Hodgson | 7/167 |
| 4,539,749 | A * | 9/1985 | Hyeong-Woon | 30/147 |
| D284,442 | S * | 7/1986 | Chan | D7/645 |
| 4,727,609 | A * | 3/1988 | Smith, Jr. | 7/158 |
| 4,823,467 | A * | 4/1989 | Campbell et al. | D7/649 |
| 4,995,154 | A * | 2/1991 | Bamber | 30/147 |
| D319,374 | S * | 8/1991 | Johannsen | D7/689 |
| 5,092,050 | A | 3/1992 | Bardeen | |
| 5,327,650 | A * | 7/1994 | Rojas | 30/147 |
| 5,701,675 | A * | 12/1997 | Hall et al. | 30/123 |
| 5,839,197 | A | 11/1998 | Durst | |
| D401,816 | S * | 12/1998 | Allison | D7/688 |
| 6,342,175 | B1 * | 1/2002 | Brown et al. | 264/155 |
| 6,497,046 | B1 * | 12/2002 | Bardeen et al. | 30/342 |
| 7,013,568 | B2 * | 3/2006 | Schmidt | 30/147 |
| 7,055,200 | B2 * | 6/2006 | Lion et al. | 7/113 |
| 7,100,288 | B2 * | 9/2006 | Kohler et al. | 30/147 |
| D536,222 | S * | 2/2007 | Heiberg et al. | D7/645 |
| 7,415,744 | B1 * | 8/2008 | Williams | 7/125 |
| 8,387,188 | B2 * | 3/2013 | Murphy | 7/147 |
| 8,528,736 | B2 * | 9/2013 | Teys et al. | 30/324 |
| D693,188 | S * | 11/2013 | Smith et al. | D7/643 |
| D709,741 | S * | 7/2014 | Barber | D7/691 |
| 2004/0035008 | A1 * | 2/2004 | Teich et al. | 30/324 |
| 2004/0237311 | A1 | 12/2004 | Brown et al. | |
| 2005/0102845 | A1 * | 5/2005 | Dallas et al. | 30/308 |
| 2007/0071843 | A1 | 3/2007 | Jackson et al. | |
| 2007/0079513 | A1 * | 4/2007 | Lago-Arenas | 30/147 |
| 2007/0163125 | A1 | 7/2007 | Discoe et al. | |
| 2010/0108561 | A1 | 5/2010 | Bramhall | |
| 2014/0220200 | A1 * | 8/2014 | Di Guglielmo | 30/149 |

FOREIGN PATENT DOCUMENTS

| | | | |
|---|---|---|---|
| FR | 2418641 | A1 * | 9/1979 |
| FR | 2442032 | A1 * | 6/1980 |
| FR | 2511858 | A1 * | 3/1983 |
| FR | 2760955 | A1 * | 9/1998 |
| GB | 191422621 | A * | 0/1915 |
| GB | 191422788 | A * | 0/1915 |
| GB | 191423769 | A * | 0/1915 |
| GB | 191504571 | A * | 2/1916 |
| GB | 518152 | A * | 2/1940 |

OTHER PUBLICATIONS

Pumpkin Masters®, Pumpkin Carving Kits, 2014.*

* cited by examiner

PUMPKIN CARVING SPOON WITH NESTED KNIFE

BACKGROUND OF THE INVENTION

1. Field of the Invention

The present invention relates to a tool for carving a pumpkin and other similar items.

2. Background of the Invention

Pumpkin carving is an activity typically associated with Halloween, as the holiday coincides with the time that pumpkins are harvested. An activity enjoyed by small children and adults alike, pumpkin carving ranges from simple jack-o-lanterns to intricate designs. Intricate designs include not only holes cut through the pumpkin, but areas where the orange skin is removed to expose the rind therebelow. The rind itself can also be carved to create a contoured design. Depending upon how much of the orange skin and rind are carved, a visibly pleasing pattern can be created.

Several products have been developed for pumpkin carving. These include templates that are placed on the pumpkin. The design of the template is transferred to the pumpkin for the carver to follow. The design can be transferred by using ink, marker or making a series of small impressions in the skin.

In addition to the templates, small carving knives are usually included in a pumpkin carving kit. These knives are usually small in order to make the more intricate curved cuts required by the template. Pumpkin carving kits also usually include a scooper to remove the seeds and fibrous threads inside the pumpkin.

Previous pumpkin carving tools, such as disclosed in U.S. Application Publication No. 2007/0163125 (Discoe et al.) provide a scraper, without any cutting tool. Similarly, U.S. Application Publication No. 2007/0071843 (Jackson et al.) discloses a scraping tool that does not provide a cutting tool. Other carving kits provide cutting and scraping tools as separate items that cannot be connected, nested or combined in any manner, such as that disclosed in U.S. Application Publication No. 2010/0108561 (Bramhall). Other background art discloses nested utensils, such as disclosed in U.S. Pat. No. 4,332,409 (Stachowicz). In Stachowicz, the handle 12 of the larger utensil 10 is hollow to accommodate a smaller fork 30. However, the handle 12 does not underlie the remaining part of the utensil. The result is that the handle is relatively short, limiting the size of the smaller fork 30 that will fit within the handle 12.

It is an object of the present invention to provide a pumpkin carving tool having a cutting implement nested within a handle of a scraping tool.

It is also an object of the present invention to provide a knife nested within the handle of a scraping tool.

It is yet another object of the present invention to provide a knife within a handle that extends almost the entire length of a scraping tool.

These and other objects of the present invention will be apparent to one of ordinary skill in the art after reading the disclosure of the present invention.

SUMMARY OF THE INVENTION

A pumpkin carving tool has a knife nested within the handle of a scoop. The knife and scoop together serve as the only tools necessary to carve a simple or complex pattern into a pumpkin. The handle of the scoop extends under the bowl of the scoop and has a hollow interior. The knife has a handle and blade and the dimensions of the knife handle closely approximate the interior dimensions of the handle of the scoop. In this way, the knife is securely retained within the handle of the scoop until removed by the knife handle. By providing a knife nested within the scoop, a user has all utensils needed to carve a pumpkin or similar item in a convenient, compact configuration.

DETAILED DESCRIPTION OF THE PREFERRED EMBODIMENTS

Figure 1:
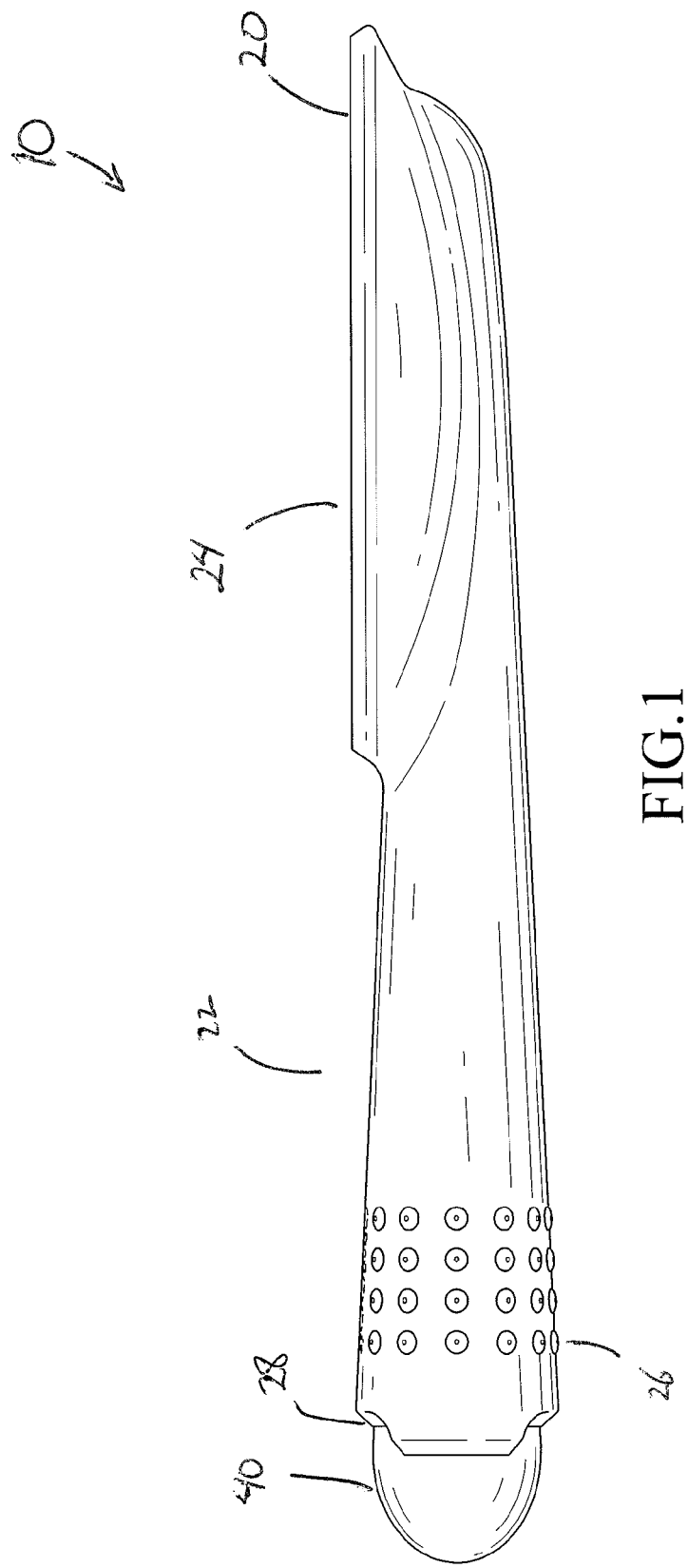
FIG. 1 is a right side view of the pumpkin carving tool.

The pumpkin carving tool 10 seen in FIG. 1 has a carving scoop 20 formed by a handle 22 and bowl 24. A knife 40 is nested within the handle 22 of the scoop. The bowl 24 is slightly concave and serves as both as scraper and a spoon for removing the seeds and fibrous threads intermixed with the seeds from a pumpkin. The handle 22 extends under the bowl 24 and terminates a short distance from the edge at the top of the bowl 24. In this manner, the handle 22 does not increase the thickness of the edge of the bowl and alter the ability to serve as a scraper.

Figure 2:
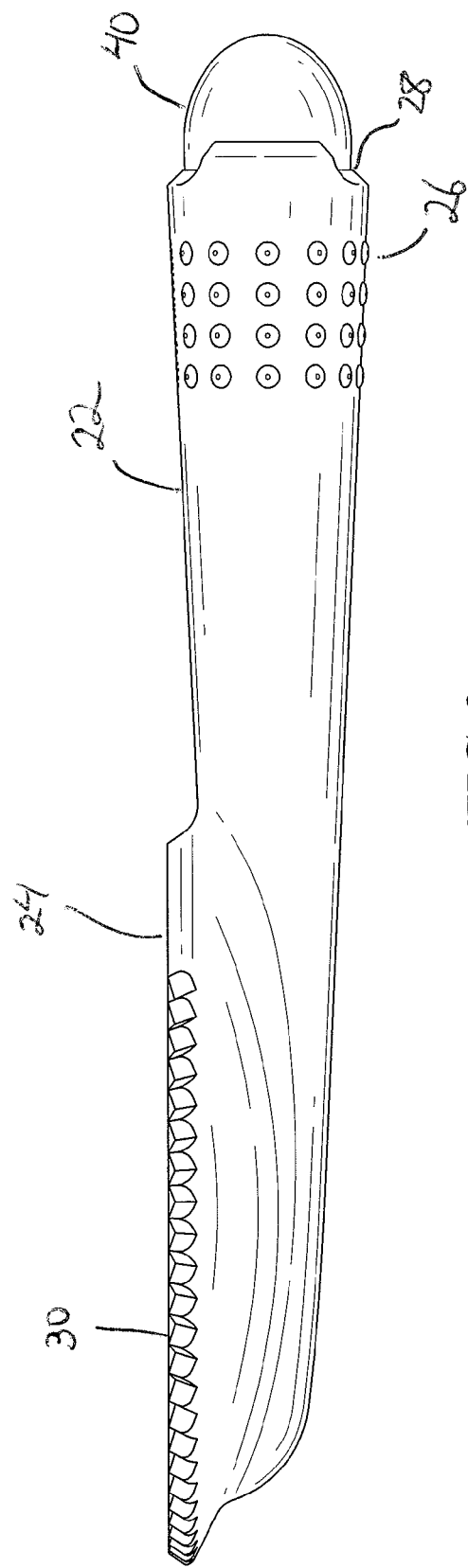
FIG. 2 is a left side view thereof.

The handle 22 has a conical shape with protrusions 26 formed at the top of the handle 22 to improve the ability to grip the handle 22. The handle 22 is hollow to receive the knife 40, as will be explained later. The open end of the handle has notches 28 in the edge to allow the user to grip the knife 40 when the knife 40 is to be removed. FIG. 2 depicts the left side of the pumpkin carving tool 10. The left side of the pumpkin carving tool 10 is a minor image of the right side, except for the serrations 30 along the edge of the bowl 24.

Figure 3:
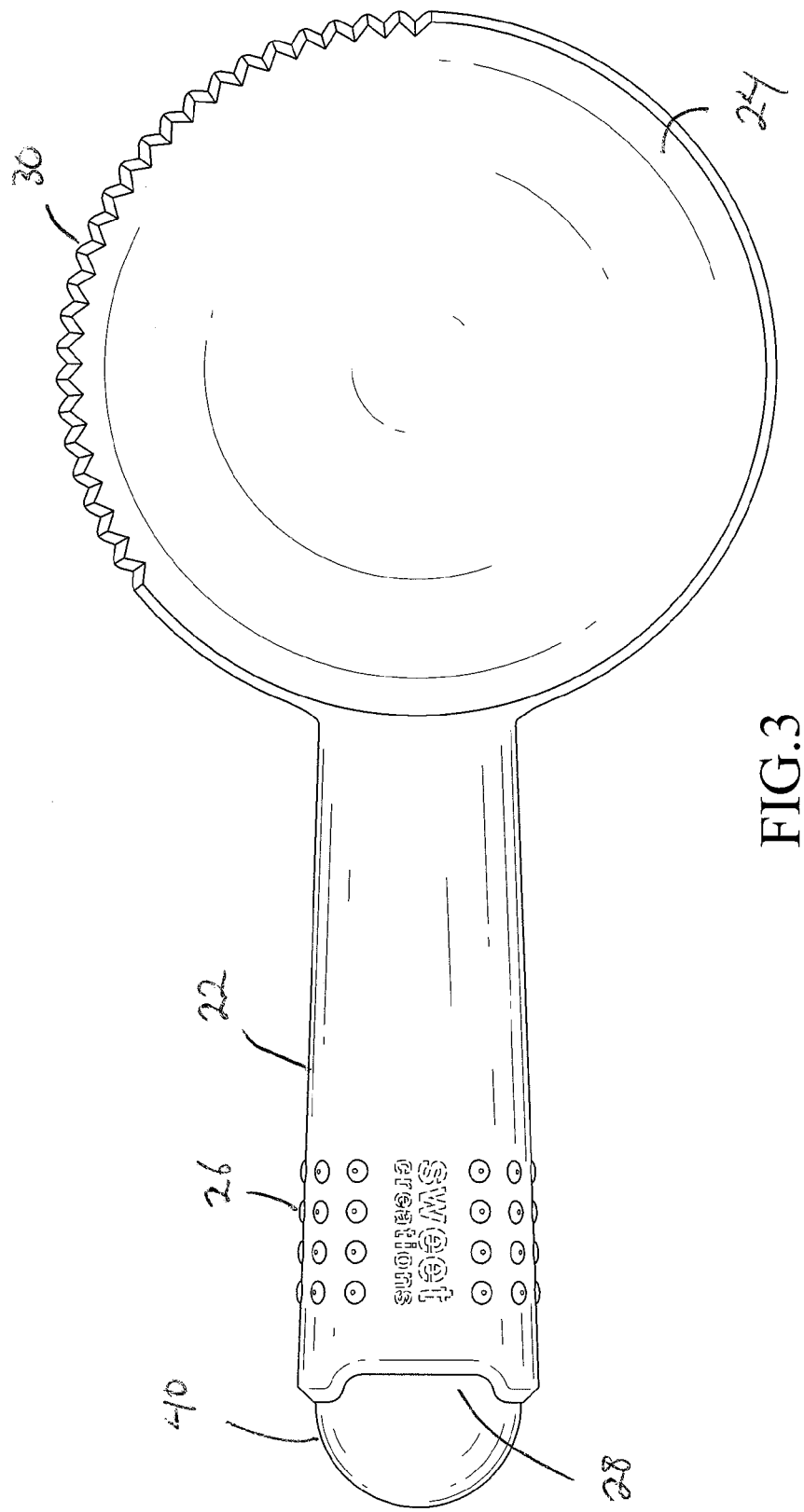
FIG. 3 is a front view thereof.
Figure 4:
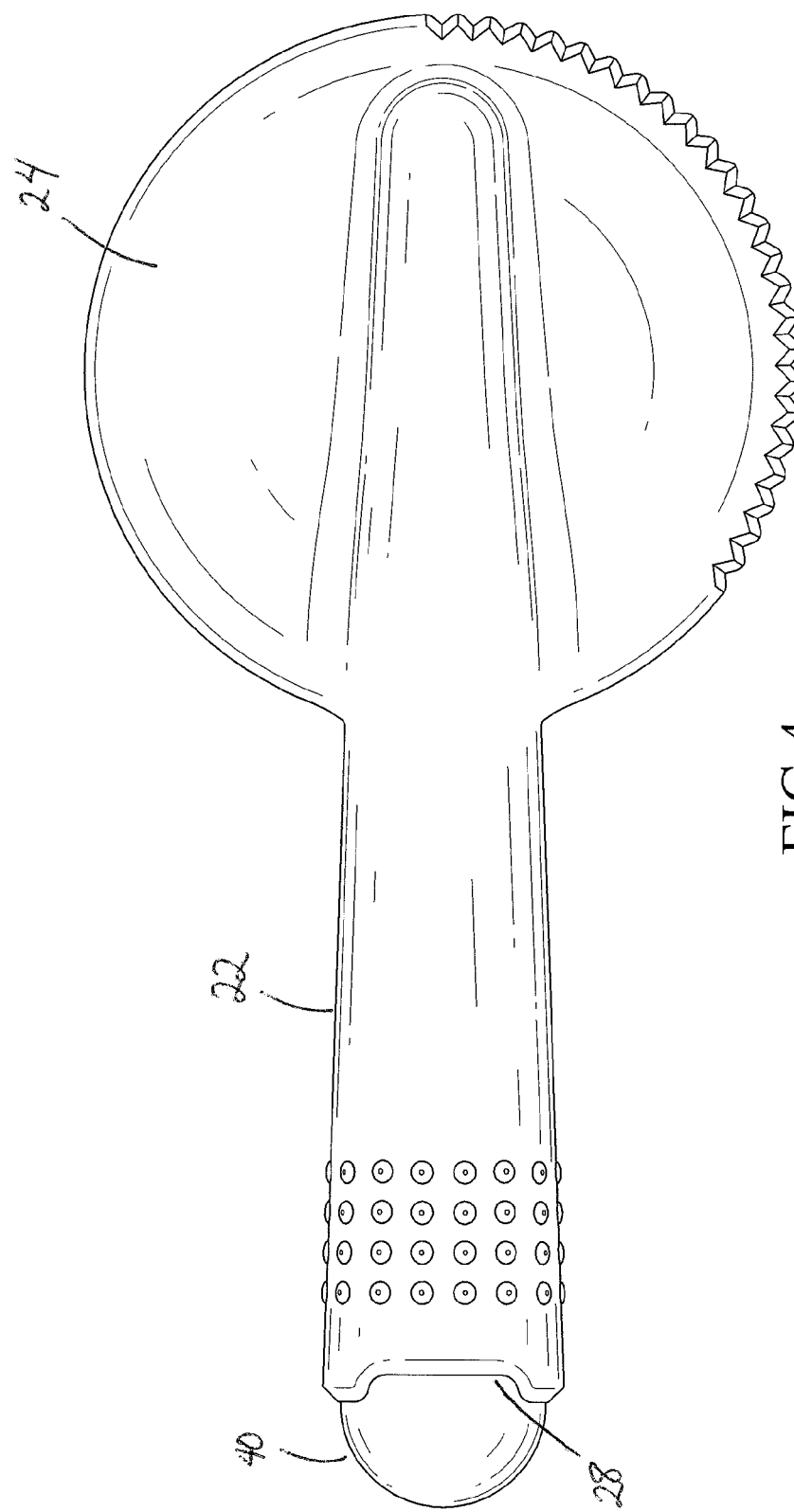
FIG. 4 is a rear view thereof.

The serrations 30 are clearly seen in the front view of FIG. 3. The serrations 30 are formed by a plurality of teeth having a generally triangular shape. As seen in FIG. 3, the serrations 30 extend over about one third of the circumference of the bowl 24, starting at the top of the bowl and extending along the left side. Of course, the serrations 30 can cover a larger or smaller extent of the circumference and can extend along the right side of the bowl 24 in addition to or in the alternative to the left side of the bowl. FIG. 4 depicts the rear view of the pumpkin carving tool 10. This view clearly depicts the end of the handle 22 ending a short distance from the top of the bowl 24. In this view, the serrations 30 appear to be on the right side of the bowl from the point of view of a user.

The serrations 30 serve a dual purpose. The serrations 30 can be used to scrape and retain the fibrous strands found inside the pumpkin better than the smooth edge of the bowl, enhancing the ability to remove the fibrous strands from the pumpkin. In addition, the serrations 30 can be used to mark the surface of the pumpkin when transferring a pattern from a template to the pumpkin. To create the pattern on the pumpkin, one end of the serrations 30 is placed on a line of the pattern to be transferred to the pumpkin. The tool is then rotated so that the serrations travel along the line to be transferred. The serrations 30 will create small impressions for the user to follow when carving the pumpkin. It should also be noted that the serrations 30, while being sharp enough to scrape and mark the pumpkin, should not be so sharp that a user, typically a child, will be cut by the serrations 30.

Figure 5:
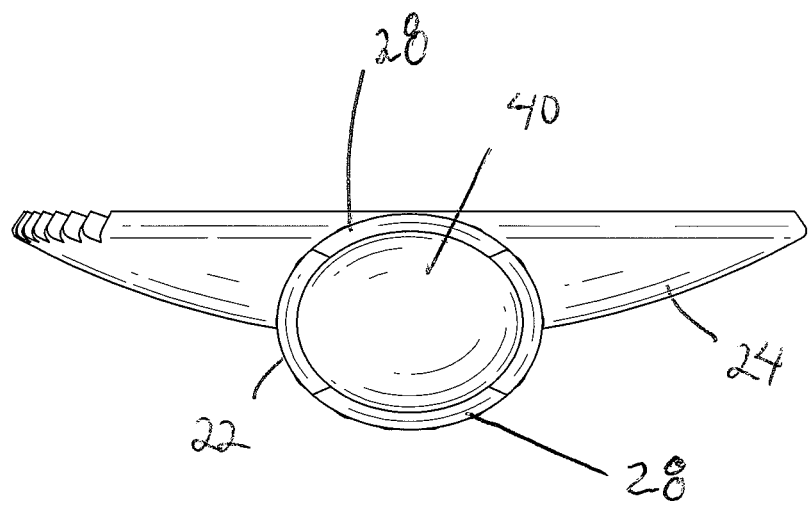
FIG. 5 is a bottom view thereof.
Figure 6:
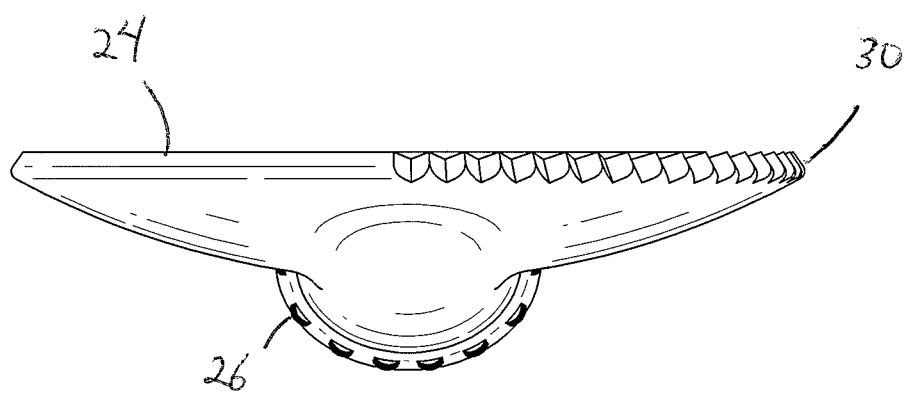
FIG. 6 is a top view thereof.
Figure 7:
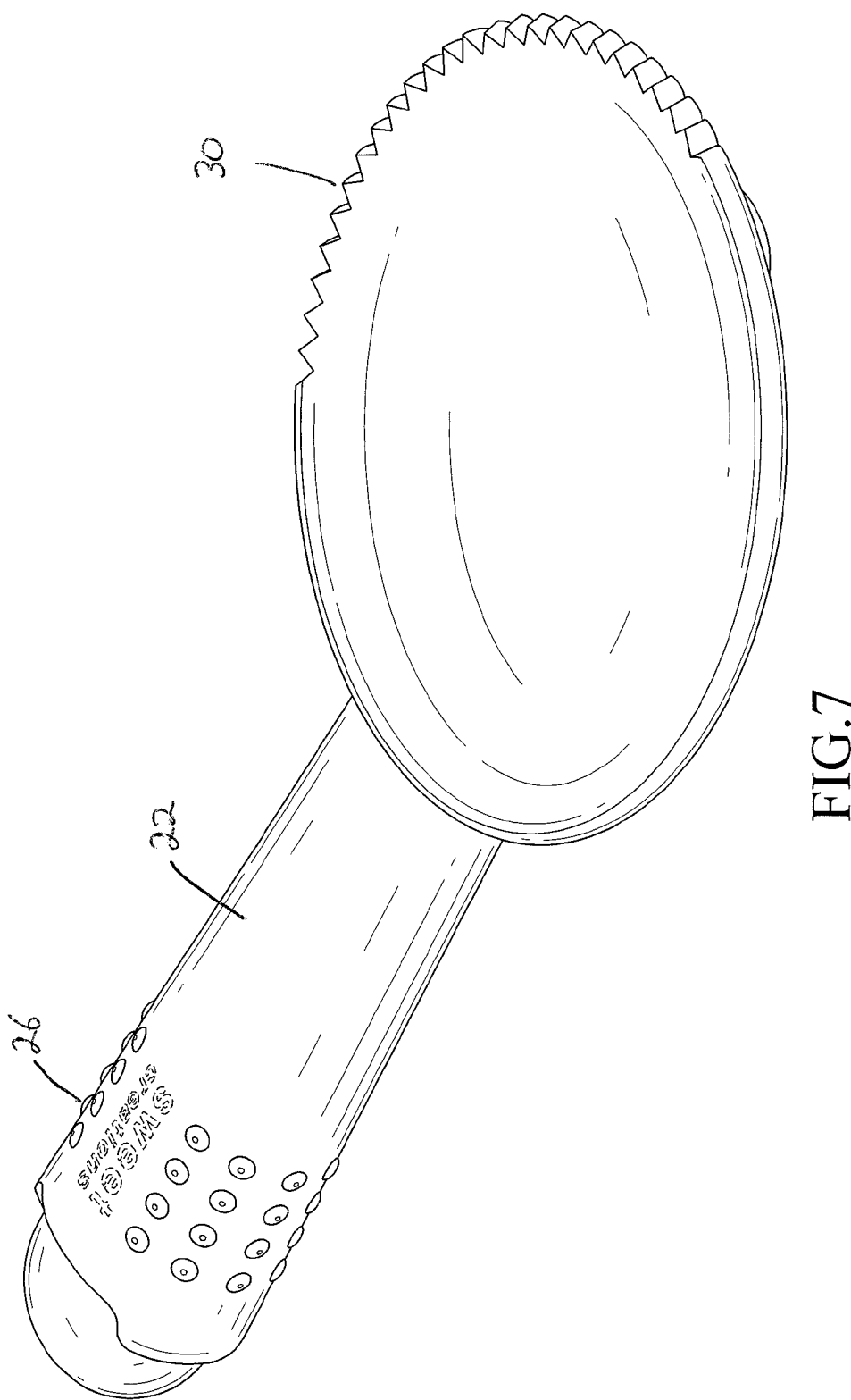
FIG. 7 is a top perspective view thereof.

The bottom of the pumpkin carving tool 10 is seen in FIG. 5. The close fit of the knife 40 within the handle 22 is clearly seen, as are the opposed notches 28 at the open end of the handle 22 allowing the knife 40 to be easily grasped when removed from the handle 22. FIG. 6, a top view of the pumpkin carving tool 10, depicts the tapered shape of the handle 22, as the far end of the handle 22 is seen to be larger than the end of the handle 22 under the bowl 24. The perspective view of the tool is seen in FIG. 7.

Figure 8:
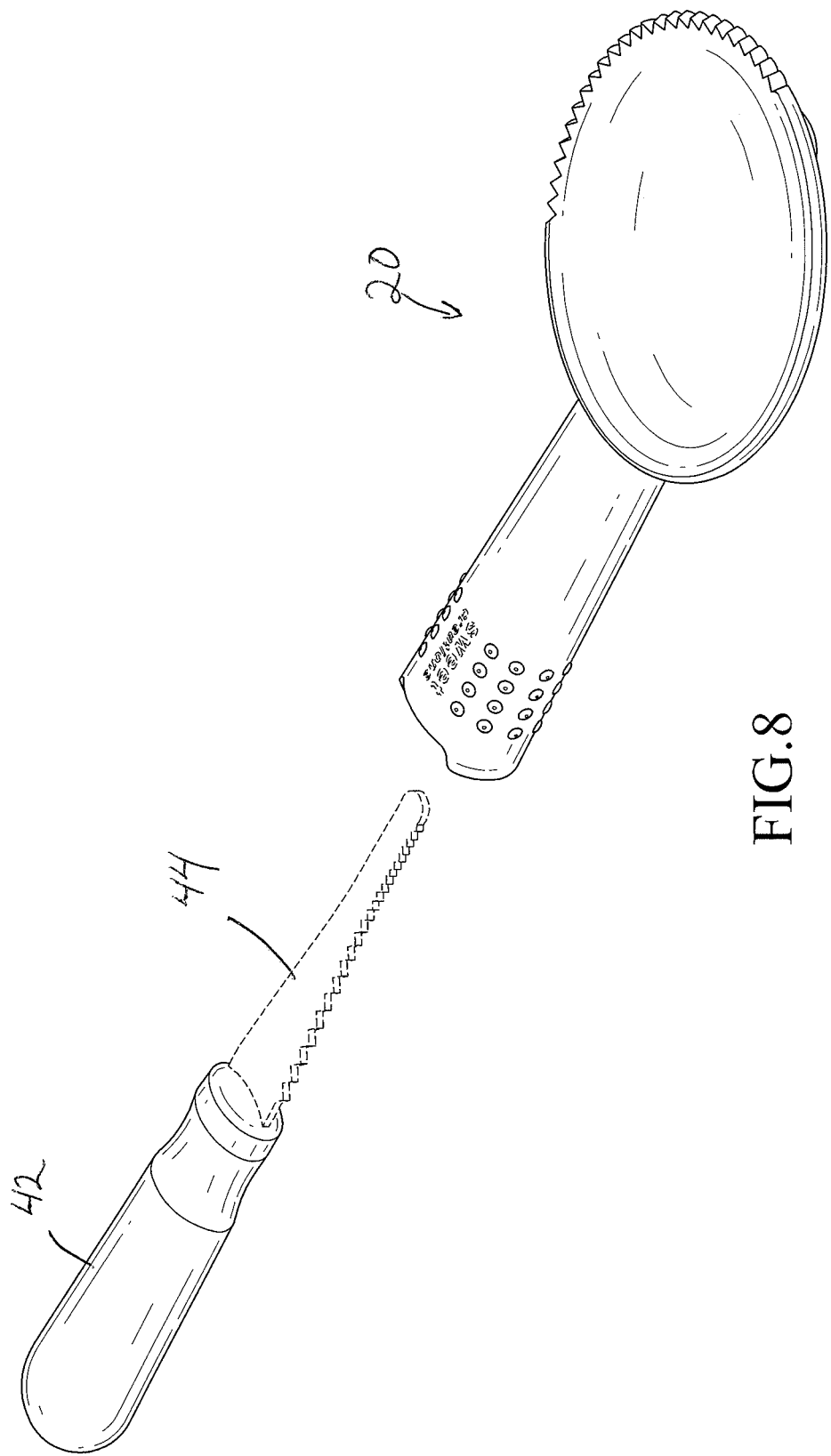
FIG. 8 is a top perspective view of the pumpkin carving tool with the knife removed from the scoop handle.

The knife 40 is most clearly seen in FIG. 8. The knife has a handle 42 and blade 44. The blade 44 has serrations to carve a pumpkin and may have either a rounded or pointed tip. The blade 44 is thinner than the handle 42 and the size and shape of the handle 22 closely approximates the interior dimensions of the lower half of the scoop handle 22. When fully inserted, the tip of the blade 44 comes into contact, or nearly into contact, with the top end of the scoop handle 22 within the interior of the scoop handle 22. The hollow within the interior of the scoop handle 22 extends from the open end past the perimeter of the bowl 24 and adjacent to the opposite perimeter of the bowl 24 at the top of the bowl 24. Therefore, when the knife 40 is fully inserted within the scoop handle 22, the blade 44 of the knife overlaps with the bowl 24. The end of the knife handle 42 protrudes form the scoop handle 22 so as to be accessible to the use for extracting the knife handle 42. The close tolerance between the dimensions of the knife handle 42 and the interior dimensions of the scoop handle 22 ensure that the knife 40 stays securely within the scoop handle 22 until removed by the user.

Although the present invention has been described with a preferred embodiment of the knife having a blade 44, one having ordinary skill in the art will recognize that the knife could also be a different type of tool for pumpkin carving or for other purposes. For instance, the knife could be a wheel used to form holes in the skin of the pumpkin when transferring a pattern to the outside surface of the pumpkin.

While the present invention has been described with reference to a preferred embodiment, variations and modifications would be apparent to one of ordinary skill in the art without departing from the scope of the invention. The present invention encompasses such variations and modifications.

I claim:

1. A carving tool, comprising:
   a scoop having a handle and a bowl, the handle extending under the bowl and intersecting an edge of the bowl at a first point, the handle having a hollow interior and an open end opposite the bowl; and
   a knife fitting within the hollow interior of the handle,
   wherein a length of the hollow interior of the handle is greater than the distance from the open end of the handle to the first point on the edge of the bowl.

2. The carving tool of claim 1, wherein the knife has a length greater than the length of the hollow interior of the handle.

3. The carving tool of claim 1, further comprising serrations formed in the edge of the bowl.

4. The carving tool of claim 2, wherein the serrations extend over about one third of the edge of the bowl.

5. The carving tool of claim 1, further comprising a pair of notches formed in an edge defining the open end of the handle.

6. The carving tool of claim 1, wherein an end of the knife extends beyond the open end of the handle when the knife is fully inserted in the hollow interior of the handle.

7. The carving tool of claim 1, wherein the knife has a handle and a serrated blade.

8. The carving tool of claim 1, wherein the hollow interior of the handle extends beyond the first point on the edge of the bowl such that the knife overlaps with the bowl when the knife is fully inserted within the handle.

9. A carving tool, comprising:
   a scoop having a handle and a bowl, the handle comprising:
   a first section extending radially outwardly from a perimeter of the bowl;
   a second section extending from the first section and radially inwardly from the perimeter of the bowl;
   a compartment extending through the first section and the second section; and
   an open end of the compartment formed at an end of the first section; and
   a knife fitting within the compartment of the handle, the knife having a length greater than a length of the first section of the handle.

10. The carving tool of claim 9, further comprising serrations formed in the perimeter of the bowl.

11. The carving tool of claim 10, wherein the serrations extend over about one third of the perimeter of the bowl.

12. The carving tool of claim 9, further comprising a pair of notches formed in an edge defining the open end of the handle.

13. The carving tool of claim 9, wherein an end of the knife extends beyond the open end of the handle when the knife is fully inserted in the compartment.

14. The carving tool of claim 9, wherein the knife has a handle and a serrated blade.

15. The carving tool of claim 9, wherein the knife overlaps with the bowl when the knife is fully inserted within the compartment of the handle.

16. A carving tool, comprising:
   a scoop having a handle and a bowl, the handle comprising:
   a first section extending radially outwardly from a perimeter of the bowl;
   a second section extending from the first section and radially inwardly from the perimeter of the bowl;
   a compartment extending through the first section and the second section; and
   an open end of the compartment formed at an end of the first section; and
   a utensil fitted within the compartment.

* * * * *